United States Patent [19]

Grove

[11] 4,062,464
[45] * Dec. 13, 1977

[54] MOUNTING BRACKETS FOR AN ARTICLE HANDLING APPARATUS

[76] Inventor: Russell E. Grove, 1440 W. Bullard, Fresno, Calif. 93711

[ * ] Notice: The portion of the term of this patent subsequent to May 4, 1993, has been disclaimed.

[21] Appl. No.: 734,138

[22] Filed: Oct. 20, 1976

[51] Int. Cl.² .............................................. B60R 9/04
[52] U.S. Cl. ............................... 214/450; 224/42.1 H
[58] Field of Search .................. 214/450, 85.5; 224/42.1 E, 42.1 F, 42.1 G, 42.1 H; 248/226.1

[56] References Cited

U.S. PATENT DOCUMENTS

| 3,282,455 | 11/1966 | Demarais | 214/450 |
| 3,381,866 | 5/1968 | Wickett | 224/42.1 E |
| 3,387,727 | 6/1968 | Micheel | 214/450 |
| 3,954,199 | 5/1976 | Grove | 214/450 |

FOREIGN PATENT DOCUMENTS

| 1,084,496 | 7/1954 | France | 224/42.1 G |
| 1,316,572 | 12/1962 | France | 224/42.1 E |

Primary Examiner—L. J. Paperner
Attorney, Agent, or Firm—Huebner & Worrel

[57] ABSTRACT

In combination with an apparatus for stowing articles aboard an overland vehicle, a set of brackets, each being characterized by an elongated base member having a thickness such that its reception within the channel of a drip mold is accommodated, while a clamp is provided for securing the bracket in place.

2 Claims, 6 Drawing Figures

U.S. Patent     Dec. 13, 1977     4,062,464
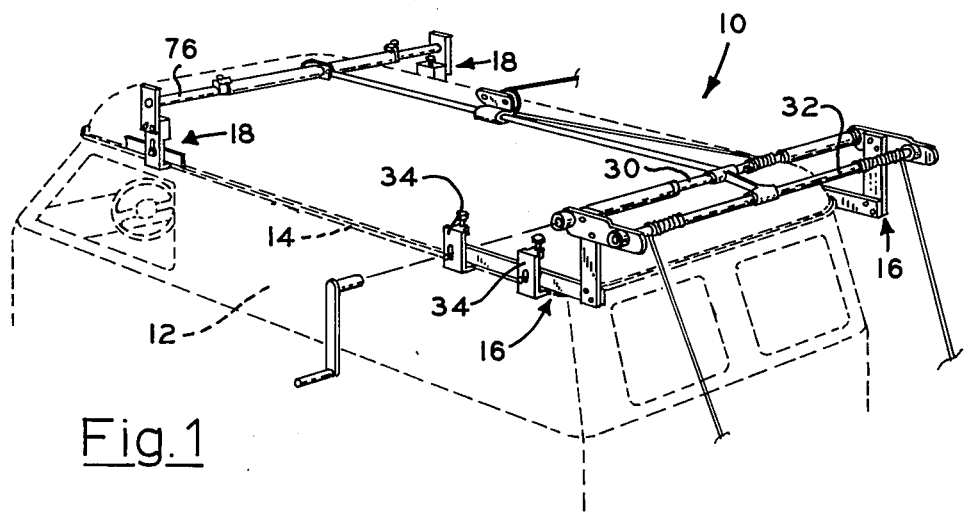
Fig.1
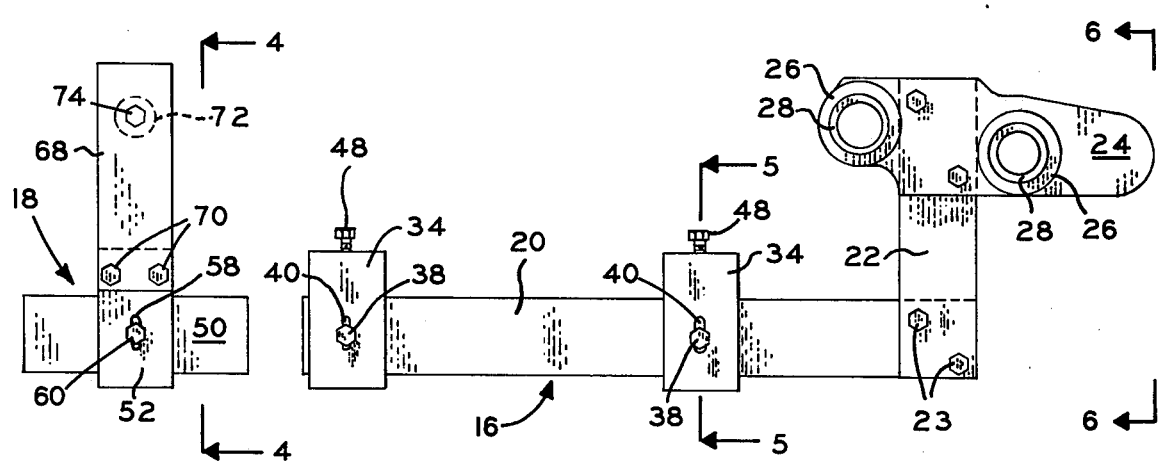
Fig.2          Fig.3
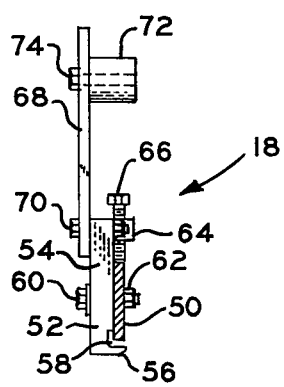    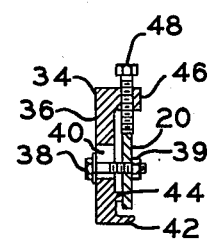    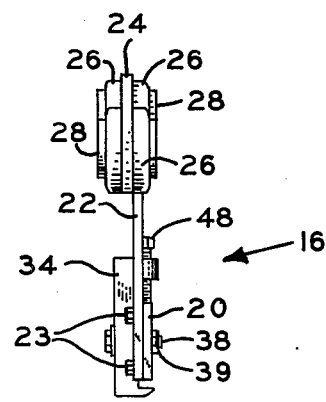
Fig.4          Fig.5          Fig.6

MOUNTING BRACKETS FOR AN ARTICLE HANDLING APPARATUS

BACKGROUND OF THE INVENTION

1. Field of the Invention

The invention generally relates to an article handling apparatus and more particularly to an article handling apparatus particularly suited for use in stowing articles such as skis, small boats and the like atop an overland vehicle such as a van, station wagon or the like equipped with a drip mold circumscribing the uppermost portion thereof. A similar apparatus particularly adapted for handling small boats is fully disclosed in U.S. Pat. No. 3,954,199 which is incorporated herein by reference thereto. However, it is to be understood that utility of the invention as hereinafter described and claimed is not limited to boats, even though the class of articles handled is typified by small boats, as will be alluded to for purposes of exaemplification.

2. Description of the Prior Art

While the apparatus disclosed and claimed in the aforementioned U.S. Pat. No. 3,954,199 has functioned quite satisfactorily for its intended purpose, difficulty has been encountered in the mounting thereof atop vehicles such as vans, station wagons, and the like. This results, at least in part, from an owner's inherent reluctance to puncture the wall of the vehicle for purposes of attaching upright supports thereto.

It is therefore the general purpose of the instant invention to provide an improved apparatus adapted to be attached to a drip mold extended along the top portions of a selected vehicle and used in the mounting of apparatus adapted for use in the stowing and transport of articles such as skis, boats and the like.

OBJECTS AND SUMMARY OF THE INVENTION

It is an object of the instant invention to provide an improved apparatus of a type particularly suited for use in stowing and transporting articles such as skis, boats and the like atop overland vehicles.

Another object is to provide improved brackets for supporting an article handling apparatus atop an overland vehicle.

It is another object to provide in an apparatus particularly suited for use in stowing articles such as boats and the like atop overland vehicles brackets adapted to be received within and attached to the channel of a drip mold.

Another object is to provide in an apparatus for use in stowing boats atop overland vehicles a plurality of brackets including upright members adapted to be attached to a drip mold and having receptacles formed therein for receiving a plurality of members transversely oriented with respect to the vehicle, at least one of which comprises the barrel of a windlass.

These and other objects and advantages are achieved by including in an apparatus of the type aforementioned a plurality of brackets, each including an elongated base member characterized by a thickness such that it is adapted to be received within the channel of a drip mold for an overland vehicle, a movable jaw mounted on the base member adapted to be drawn into a biting relationship with the drip mold, and an upright member projected from the base member having a receiver for a member extended transversely of the vehicle, at least one pair of the upright members being provided with bearing sleeves for receiving the opposite ends of the barrel of a windlass, whereby a boat may be drawn upwardly and stowed for transport atop the vehicle, as will become more readily apparent by reference to the following description and claims in light of the accompanying drawings.

BRIEF DESCRIPTION OF THE DRAWINGS

FIG. 1 is a partially exploded view of an apparatus embodying the principles of the instant invention mounted atop a van, illustrated in phantom employing brackets mounted in and attached to a drip mold partially circumscribing the top portion of the van.

FIG. 2 is a side elevation of one of the brackets shown in FIG. 1.

FIG. 3 is a side elevation of another of the brackets shown in FIG. 1.

FIG. 4 is a cross-sectional view taken generally along lines 4—4 of FIG. 2.

FIG. 5 is a cross-sectional view taken generally along lines 5—5 of FIG. 3 while FIG. 6 is an end view of the bracket shown in FIG. 3.

DESCRIPTION OF THE PREFERRED EMBODIMENT

Referring now to the drawings with more particularity, wherein like reference characters designate like or corresponding parts throughout the several views, there is shown in FIG. 1 a boat handling apparatus, generally designated 10, mounted atop an overland vehicle such as a van, designated 12.

The van is provided with a drip mold 14 extended in substantial circumscribing relation along the uppermost portion thereof for catching run-off. It is important to appreciate that the apparatus 10 may be mounted atop any vehicle having a drip mold. A drip mold 14 is, of course, of a gutter-like configuration having a channel defined between the surface of the vehicle and an upstanding lip, not designated. Since drip molds for motorized vehicles are of well-known construction, a more detailed description of the drip mold 14 is omitted in the interest of brevity. However, it should be appreciated that the drip mold 14 may be continuous or, where desired, interrupted at locations suitable for accommodating discharge of run-off. Where the drip mold is of a continuous configuration, a suitable kerf is formed therein for accommodating a mounting of the apparatus 10, as will hereinafter be better appreciated.

The apparatus 10 is supported by a pair of rear brackets, each being designated 16, and a pair of front brackets, each being designated 18. The brackets 16 are similarly configured and are similarly constructed, while the brackets 18 are similarly configured and similarly constructed. Therefore, a detailed description of one of the brackets 16 and one of the brackets 18 is deemed adequate to provide a complete understanding of the invention herein disclosed.

Turning first to the rear brackets 16, it is important to appreciate that each of the brackets 16 includes a base member 20 of an elongated configuration having a thickness no greater than the width of the channel of the drip mold which is to receive the base. Hence, the base member is readily received within a linear segment of the channel of the drip mold 14. The width of the base member 20 is suitable for imparting the necessary rigidity and strength thereto. As a practical matter, the base member 20 is formed of a relatively strong, rigid, lightweight material, such as aluminum, which readily lends itself to fabrication.

Near one end of the base member 20, hereinafter referred to as the rearmost portion of the base member 20, there is attached an upstanding member 22 which, as shown, is bolted to the base member and employed as a corner post for the apparatus 10. However, it should be apparent that other techniques are, when desired, employed equally as well in attaching the member 22 to the base member. For example, welds and the like serve quite satisfactorily for this purpose.

The upstanding member 22 is in turn provided with a cross-arm 24 of an elongated configuration extended in transverse relation with the member 22. The cross-arm 24 serves as a bracket for mounting transverse members. For example, where the boat handling apparatus of the aforementioned U.S. Pat. is to be mounted, the bracket is provided with a pair of horizontally spaced tubular receivers 26 within each of which there is seated a bearing sleeve 28. Each of the bearing sleeves is formed of a suitable material, such as Teflon, which serves to support one end of one of a pair of transversely oriented barrels, designated 30 and 32, for a pair of windlasses, not designated, arranged in juxtaposition. The windlasses are employed in positioning a boat atop the van 12 in a manner fully described in the aforementioned U.S. Pat. No. 3,954,199. It is to be understood, however, that each of the barrels 30 and 32 is supported for rotation and employed for winding and paying out lines in a known manner, as will hereinafter be more fully understood.

Each of the rear brackets 16 is provided with a pair of clamps 34 adapted to securely fasten the bracket to the drip mold 14. As best shown in FIG. 5, the clamp 34 includes a machined body 36 extended in transverse relation with respect to the base member 20 and is connected thereto by a bolt 38 having a nut 39 provided at its threaded end. The bolt is passed through a vertically extended slotted opening 40 formed in the body 36 and received in an aperture formed in the base member 20. Thus the body 36 is repositionable transversely of the base member 20.

Moreover, the body 36 includes a lip 42 extended inwardly toward the van 12 and positioned beneath the level of the drip mold 14. Additionally, a lip 44 is positioned to engage the base member 20 in spaced relation with the lip 42. Moreover, the lip 42 is adapted to be seated on the upper surface of the outer lip of the drip mold 14. Thus the adjacent surfaces of the base member 20 and the lips 42 and 44, in effect, collectively define a slot of a generally L-shaped configuration, FIG. 5, which serves to receive therein the drip mold 14 with the base member 20 seated in the channel thereof. It will therefore be appreciated that the lip 42 as it is moved toward the base member 20 acquires a purchase or bite on the drip mold 14 and that upon tightening the nut 39 the purchase is maintained for purposes of maintaining the bracket 16 in position.

In order to move the lip for thus assuring that a purchase is taken on the drip mold, the body 36 of the clamp 34 is provided with an inwardly projected protuberance 46 having a jackscrew 48 extended therethrough in a screw threaded relationship therewith. The distal or lower end of the jackscrew is seated on the upper surface of the base member 20. Therefore, by applying torque to the jackscrew 48, the body 36 of the clamp 34 is caused to move upwardly with respect to the base member 20 and approach the lower surface of the drip mold so that a purchase is taken thereon in a vice-like fashion. Of course, transverse motion of the body 36 is accommodated through a loosening of the nut 39 while a tightening of the nut 39 serves to restrain the body 36 of the clamp 34 from motion relative to the base member 20. Thus the brackets 16 are positioned and secured in place relative to the drip mold 14.

Turning now to FIG. 2, it can be appreciated that each of the forward brackets 18 is provided with a base member 50. Like the base member 20, the base member 50 has a thickness such that it is received readily within the channel of the drip mold 14 in spaced relation with the bracket 16. The base member 50, also like the base member 20, is formed of a lightweight, rigid material, such as aluminum, which readily lends itself to conventional fabrication techniques.

To the base member 50 there is attached a clamp 52 having a body 54 similar in many respects to the body 36 of the clamp 34. It is important to appreciate that the body 54 of the clamp 52 also includes a lip 56 projected from the lower portion of the body 50, while the body 50 is machined to provide a transversely oriented relief 58 disposed in juxtaposition with the lip 50. Thus a recess is defined within the body 50, the function of which is to receive the drip mold 14. Thus the bracket 18 is mounted on the drip mold 14 in much the same manner as that in which the bracket 16 is mounted.

The body 54 of the clamp 52 also is provided with a slotting opening, designated 58, through which is extended a bolt 60 having a nut 62 provided at its distal end. As a practical matter, this bolt is passed through a suitably formed bore provided in the base member 50 so that the body 54 thus is supported to be displaced transversely with respect to the base member 50.

In order to impart the desired displacement of the body 54 relative to the base member 50, the body 54 is provided with a protruding lip 64 having a threaded bore extended therethrough. A jackscrew 68 is received within the bore and mated with the threads thereof. Transverse motion of the body 54 relative to the base 50 is, of course, facilitated by loosening the nut 62 of the bolt 60, while a tightening thereof serves to secure the body 54 in a rigidly fixed relationship with the base 50. Thus the bracket 18 is affixed to the drip mold simply by positioning the base member 50 within the channel of the drip mold 14 and thereafter tightening the jackscrew 66 until the lip 56 is drawn, in a vice-like manner, into a biting relationship with the drip mold for obtaining a purchase thereon. Assurance that the purchase thus acquired is maintained is achieved simply by tightening the nut 62.

Also affixed to the body 54 of the clamp 52 is an upright member 68. While the upright member 68 is, as illustrated, attached at its base end to the base member 50 through a use of bolts 70, it is to be understood that any suitable means such as welds and the like may be employed equally as well for this purpose. To the extended end of the upright member 68 there is affixed a receiver 72. It is to be appreciated that the configuration of the receiver 72, as well as the particular manner in which the receiver is affixed to the upright member 68, is varied as desired. In practice, the receiver 72 is connected to the upright member employing a threaded bolt received in a blind bore, not designated. While the particular configuration of the receiver 72 may be varied, as shown, it is consistent with that of the receiver shown in U.S. Pat. No. 3,954,199, aforementioned.

In view of the foregoing, it should be apparent that the device 10, hereinbefore disclosed, provides a satisfactory solution to the problem of providing for stowage of small boats and the like atop overland vehicles such as vans and the like.

OPERATION

While the operation of the apparatus 10 including the brackets 16 and 18 is deemed readily apparent, particularly in view of the disclosure of the aforementioned U.S. Pat. No. 3,954,199, incorporated herein by reference, the operation thereof will be summarized briefly at this point.

It is to be understood that in order to mount the apparatus 10, the base members 20 of the brackets 16 are seated in a drip mold 14 circumscribing the uppermost portion of the van and are secured in place simply by tightening the jackscrews 48 so that the lips 42 of the clamps 34 engage a lower surface of the drip mold. Subsequently, the nuts 39 are tightened on the bolts 38 for thus securing the bodies 36 of the clamps 34 in fixed relationship with respect to the base members 20 as well as the drip mold 14. Of course, the ends of the barrels 30 and 32 are positioned within the bearing sleeves 28 to be employed in a manner consistent with that disclosed for the barrels of the windlasses of the aforementioned U.S. patent. However, it should be apparent that the manner in which the barrels or other transverse members are attached to the bracket 16 may be varied as desired.

Similarly, the brackets 18 are attached to the drip mold 14 by positioning the base members 50 within the channel of the drip mold and tightening the jackscrew 66 until a purchase is taken. Again, it is to be understood that the transverse member 76 is secured to the upright member 68 and employed in a manner consistent with that in which the upright members are employed for supporting the apparatus disclosed in the aforementioned U.S. patent, for example.

Once an apparatus such as the boat handling apparatus 10 is mounted atop the van 12, in the manner hereinbefore described, the apparatus is employed in a manner consistent with its intended purposes.

In view of the foregoing, it should readily be apparent that the instant invention provides a practical solution to perplexing problems encountered in stowing articles such as skis, boats and the like atop overland vehicles having a drip mold extended along the top portion thereof.

Althouth the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by letters patent is:

1. In a boat handling apparatus particularly suited for use in stowing boats aboard an overland vehicle, the improvement comprising:
A. a pair of windlasses each being characterized by an elongated, rotatable barrel adapted to be extended transversely across the top of an overland vehicle, means for mounting said pair of windlasses atop a vehicle having a drip mold including a first pair of brackets, each bracket of said pair being characterized by an elongated base member having a thickness such that the base member is receivable in the channel of the drip mold, an upright member rigidly affixed to the base member including a pair of mutually spaced bearing sleeves for receiving the end portions of the barrels of said pair of windlasses, and means for securing the base member to the drip mold including a pair of movable jaws mounted on said base member for receiving the drip mold in a biting relationship;
B. a transverse bar of a tubular configuration adapted to be positioned in spaced parallelism with the barrels of said pair of windlasses, and means for mounting said transverse bar atop the vehicle including a second pair of brackets, each bracket of said second pair of brackets being characterized by an elongated base member having a thickness such that the base member is receivable in the channel of the drip mold, and an upright member rigidly affixed to the base member including a stub shaft for receiving an end portion of the transverse bar in telescoping relation, and means for securing the base member to the drip mold including a movable jaw mounted on said base member for receiving the drip mold in a biting relationship;
C. a longitudinal beam extended between said transverse bar and one barel of said pair of windlasses;
D. a sheave mounted on said longitudinal beam in spaced relation with said one barrel;
E. a single hoisting line trained about said sheave having one end attached to said one barrel and adapted to be connected at the opposite end thereof to the prow of a boat;
F. a pair of hoisting lines attached at one end thereof to the other barrel of said pair of windlasses and adapted to be connected at the opposite end thereof to the stern of a boat;
G. means for imparting rotation to said barrels; and
H. locking means for selectively locking each of the barrels against rotation.

2. In an apparatus particularly suited for use in stowing a boat or the like atop an overland vehicle characterized by a drip mold including a channel having a horizontally projected bottom segment extended along a top portion of the vehicle, the improvement comprising:
a pair of mounting brackets for supporting a member adapted to be transversely related to the vehicle, each bracket of said pair being characterized by an elongated base member having a thickness such that the base member is receivable within the channel of the drip mold and adapted to seat on the upper surface of the bottom segment thereof, an upright member rigidly affixed to the base member including means provided in spaced relation with said base member for receiving said transverse member, means defining a clamp having a body provided with a first projected protuberance disposed above the base member in spaced relation therewith, means defining in said body a vertically slotted opening and a stud mounted on said base member and extended horizontally through the opening having a nut received at its distal end adapted to be releasably tightened for joining the clamp to the base member and for accommodating vertical adjustment of the body of the clamp relative to the base member, a screw threaded bore extended vertically through the protuberance having a jack screw disposed therein and extended in the plane of the base member into an abutting relation therewith for vertically adjusting the position of the body of the clamp relative to said base member, means defining on said body a second protuberance projected beneath said base member for engaging the lower surface of the bottom segment of the drip mold as the base member is seated on the upper bottom surface thereof for clamping the bottom segment of the drip mold between said base member and said second protuberance of the clamp as the position of the body of the clamp is adjusted relative to said base member, and a lip projected from the body of the clamp into engaged relation with said base member for supporting said clamp against horizontal movement toward said base member as said nut is tightened on said stud.

* * * * *

UNITED STATES PATENT AND TRADEMARK OFFICE
CERTIFICATE OF CORRECTION

PATENT NO. : 4,062,464
DATED : December 13, 1977
INVENTOR(S) : Russell Grove

It is certified that error appears in the above-identified patent and that said Letters Patent are hereby corrected as shown below:

Column 1, line 20, delete "exaemplification" and insert

---exemplification---.

Column 5, line 18, delete "jackscrews" and insert

---jackscrew---.

Signed and Sealed this

Eleventh Day of April 1978

[SEAL]

Attest:

RUTH C. MASON
Attesting Officer

LUTRELLE F. PARKER
Acting Commissioner of Patents and Trademarks